United States Patent [19]

Chaddha

[11] 3,723,972

[45] Mar. 27, 1973

[54] DATA COMMUNICATION SYSTEM

[76] Inventor: Ashwani K. Chaddha, 200 St. Andrews Boulevard, Winter Park, Fla. 32789

[22] Filed: Nov. 24, 1971

[21] Appl. No.: 216,316

Related U.S. Application Data

[63] Continuation of Ser. No. 874,301, Nov. 5, 1969.

[52] U.S. Cl. ....................340/172.5

[51] Int. Cl. ....................G06f 3/04

[58] Field of Search ....................340/172.5

[56] References Cited

UNITED STATES PATENTS

| | | | |
|---|---|---|---|
| 3,568,164 | 3/1971 | Schiller | 340/172.5 |
| 3,416,141 | 12/1968 | De Castro | 340/172.5 |
| 3,596,254 | 7/1971 | Highleyman et al | 340/172.5 |
| 3,541,513 | 11/1970 | Paterson | 340/172.5 |
| 3,559,187 | 1/1971 | Figueroa et al | 340/172.5 |
| 3,573,740 | 4/1971 | Berger | 340/172.5 |
| 3,341,818 | 9/1967 | Mackie et al | 340/172.5 |
| 3,312,950 | 4/1967 | Hillman et al | 340/172.5 |
| 3,312,945 | 4/1967 | Berezin et al | 340/172.5 |
| 3,293,618 | 12/1966 | Klein | 340/172.5 |
| 3,241,125 | 3/1966 | Tomasulo et al | 340/172.5 |
| 3,288,928 | 11/1966 | Bartlett et al | 340/172.5 |

*Primary Examiner*—Gareth D. Shaw
*Attorney*—Blair, Cesari and St. Onge

[57] ABSTRACT

The disclosed data communication system is adapted to handle data flow to and from a plurality of individual data stations. The system assembles bits of data characters randomly and asynchronously transmitted by periodically sampling input lines in succession for input bits. The input bits are assembled and stored at selected times during each bit transmission. Fully assembled characters are transferred to a new storage location for eventual transmission to a central station. The system is also adapted to transmit data characters back to appropriate ones of the individual data stations at acceptable rates.

17 Claims, 5 Drawing Figures

INVENTOR.
Ashwani K. Chaddha
BY
Blair, Cesari and St. Onge
ATTORNEYS

INVENTOR.
Ashwani K. Chaddha
BY
Blair, Cesari and St. Onge
ATTORNEYS.

INVENTOR.
Ashwani K. Chaddha
BY
Blair, Cesari and St.Onge
ATTORNEYS

INVENTOR.
Ashwani K. Chaddha
BY
Blair, Cesari and St. Onge
ATTORNEYS.

DATA COMMUNICATION SYSTEM

This is a continuation, of application Ser. No. 874,301, filed Nov. 5, 1969.

BACKGROUND OF THE INVENTION

The present invention constitutes an improvement over the Data Handling System disclosed in U.S. Pat. No. 3,416,141, issued Dec. 10, 1968. As disclosed in this patent, teleprinter lines over which data characters arrive are connected from individual data stations to a multiple position switch. The switch is indexed to effectively connect each input line to a memory buffer register in repeating sequence. The time required for the switch to index through all of the input lines is significantly less than the pulse interval of a character bit transmitted on any one line. Each input line is sampled for the presence of a bit during the time it is selected by the switch. After a predetermined number of samplings of an input line during the presence of a bit, the bit is entered into the memory buffer register for inclusion in a character assembly word held therein. From the memory buffer register, the character assembly word is transferred to a memory for storage in a location assigned to a particular input line over which the bit is being transmitted. This process is repeated for each line, in sequence.

Since the time interval between consecutive samplings of any one input line is significantly less than the pulse interval of a teleprinter bit transmitted on that line, no bits are lost in spite of the random nature of the transmissions. In the specific embodiment disclosed in U.S. Pat. No. 3,416,141, each input line is sampled at a rate equal eight times the input baud rate. That is, all input lines are sampled eight times in the time taken to transmit one bit of a character at the adopted baud rate.

In the case where the data handling system is implemented using a programmer general purpose computer, it is found that sampling at eight times the baud rate takes up a significant portion of the computer's time, particularly when a large number of input lines are being serviced. For example, with sixty-four lines continuously outputting eight-bit characters, the maximum percentage of computer time used by the character handling sub-routine is 66 percent. This leaves only approximately one-third of the computer's time for processing data characters for transmission to and from a large central computer, for example, for transmitting data characters back to the various data stations, and for other functions possibly unrelated to teleprinter data handling.

Moreover, sampling at eight times the baud rate, with assembly of bits into the memory buffer register on the fifth sampling cycle after the presence of an input bit is detected, contemplates a maximum sampling error of 12.5 percent of the bit pulse width measured from the mid-point of the bit. Such a sampling error would occur if a bit appeared on an input line just after that line was sampled. This much deviation from the center of the bit — the optimum time for assembly — could create a problem in proper recognition if the bit pulse is significantly distorted.

When all of the bits of a character transmitted over a particular input line have been assembled into the character assembly word held in the memory buffer register, the assembled character must be transferred to a new memory location so that the character assembly word can be cleared for the assembly of the next character transmitted over that input line. This transfer also typically involves various manipulations such as the removal of start and stop bits of the assembled character, code conversion, and the inclusion of a suitable tag identifying the particular line over which the assembled character was transmitted. Additionally, the character assembly word must in some manner be initialized to facilitate recognition when a transmitted character has been fully assembled in the memory buffer register. These manipulations, performed during a subroutine immediately after the last character bit is assembled, requires a certain amount of processor time. This necessarily defers the time of sampling of subsequent input lines during that service cycle. If a number of assembled characters are processed during a single service cycle, its duration is unduly extended, leaving little or no processor time for other tasks before the next service cycle must be initiated. Moreover, undesirable variations in the sampling time of those input lines toward the end of the list occur. Such variations cause increased sampling error.

It is accordingly an object of the present invention to provide an improved data communication system for assemblying character bits of data characters randomly transmitted over plural asynchronous input lines.

A further object of the invention is to provide a data communication system of the above character which, when implemented using programmed data processing apparatus, makes more efficient use of the processor's time.

An additional object of the present invention is to provide a data communication system of the above character, wherein the magnitude of sampling error is reduced.

Yet another object of the present invention is to provide a data communication system of the above character wherein character assembly and processing of assembled data characters is carried out more efficiently.

An additional object of the present invention is to provide a data communication system of the above character wherein variations in the sampling time of input lines are held to a minimum.

Other objects of the invention will in part be obvious and in part appear hereinafter.

SUMMARY OF THE INVENTION

In accordance with the present invention, a data communication system is provided for assemblying bits of data characters randomly transmitted from a plurality of individual data sources. Means are provided for periodically sampling each data source in succession for incoming character bits. Each data source is sampled at a rate which is *n* times the rate at which the character bits are transmitted therefrom, where *n* is an odd number greater than one. Means forming a counter separately associated with each data source are cycled through a count of *n* during the interval of a character bit transmission therefrom. Additional means operating in conjunction with the sampling means is adapted to increment the counter means associated with those data sources each time they are sampled during the interval of a character bit transmission therefrom. Each time during the sampling of a particular data source when the associated counter means reaches a count of $n/2 + ½$, the character bit then being transmitted is accepted by the system for character assembly.

In the disclosed embodiment of the invention, the sampling rate is five times the rate at which character bits are transmitted from the data sources, and thus $n$ equals 5. A sampling rate of five times the rate of character bit transmission is preferred since it is the most practical compromise between sampling error on the one hand and processor time efficiency on the other.

It will be appreciated that a sampling rate of three times the character bit transmission rate would use less processor time but would provide for a large potential sampling error, whereas a sampling rate of seven or more times the character bit transmission rate would materially reduce the potential sampling error but would require considerably more processor time.

Each data source, which may take the form of a teleprinter data station has associated with it a line status word LSW and a character assembly word CAW. These words are stored in a system memory. To sample an input line connected from one of the data stations, the associated line status word LSW is retrieved from the memory. A portion of this word is read into a line selection register LSR included in the sampling means. The content of the line selection register is decoded and used to condition a gating network so as to connect the designated input line to the system. The line status word also includes a status bit which serves to designate whether the associated input line was active when last sampled. Still another portion of the line status word LSW is employed as the counter means for determining which sampling of an input line should be used to assemble the character bit being transmitted thereover. This counter portion of the line status word is incremented each time the associated input line is sampled while a data character is being transmitted thereover as signified by the condition of the status bit.

When the counter portion of the line status word, which is incremented to five and then reset in the illustrated embodiment, reaches a count of three, the associated character assembly word CAW is retrieved from memory and loaded into a memory buffer register. The transmitted character bit is entered into the memory buffer register for incorporation into the character assembly word, which is then returned to the memory.

Prior to the assembly of a data character, the character assembly word is initialized with an initialization bit. The character bits are shifted into the character assembly word as held in the memory buffer register, and, when the initialization bit reaches a predetermined stage, the system recognizes that a transmitted character has been completely assembled into the character assembly word. At this point, the assembled character must be transferred to a new memory location.

In accordance with the present invention, a load distribution register R is provided for controlling the processing of assembled characters so as to prevent undue variations in the sampling time of input lines at the tail end of the sampling cycle. Basically, the load distribution register is operated such that only $1/n$ of the total number of input lines are processed for assembled characters in any one sampling cycle. Thus, where $n$ is equal to 5, only one-fifth of the lines are processed for assembled characters in each sampling cycle.

In addition to processing incoming teleprinter character bits, the system also operates to transmit back to the various individual stations stored data designated for transmission. Each character to be transmitted is transferred in sequence from the memory to an accumulator from which the individual bits of the characters are supplied for transmission over output lines leading to the individual data stations. The data rate of these transmissions is, of course, at a suitable baud rate, typically the baud rate of the data transmissions originating from the data stations. In order not to interfere with the sampling of input lines for incoming data, the system is programmed to transmit data to a particular data station only during the intervals between sampling cycles or immediately after the input line from that data station has been sampled for incoming character bits. The character to be transmitted over a particular output line is transferred from the memory to the accumulator register. One bit of the character is transmitted, and the remainder of the character is returned to the memory.

The next character to be transmitted is transferred from the memory to the accumulator. Again, only one bit of this character is supplied to the appropriate output line for transmission, and the remainder is returned to the memory. Not all output lines are selected for character transmission in an interval between input sampling cycles. The number of output lines selected in one output cycle is equal to the total number of output lines divided by the ratio of the sampling cycle rate to the teleprinter baud rate. Thus, the teleprinter bits are transmitted over the various output lines at precisely the desired baud rate.

The invention accordingly comprises the features of construction, combination of elements, and arrangement of parts, which will be exemplified in the construction hereinafter set forth, and the scope of the invention will be indicated in the claims. For a fuller understanding of the nature and objects of the invention, reference should be had to the following detailed description taken in connection with the accompanying drawings in which:

DETAILED DESCRIPTION

Some of the components for implementing the invention are conveniently found in a typical small-scale, general purpose computer, such as the model PDP-8 and its successor PDP-8/I, manufactured by the Digital Equipment Corporation of Maynard, Massachusetts. Thus, the major portion of the block diagram of FIG. 1 corresponds to the typical block diagram of a computer. It should be understood that the various operations of the invention in handling data do not necessarily require the use of a programmed general purpose computer, as special purpose data processing apparatus could also be used.

Figure 1:
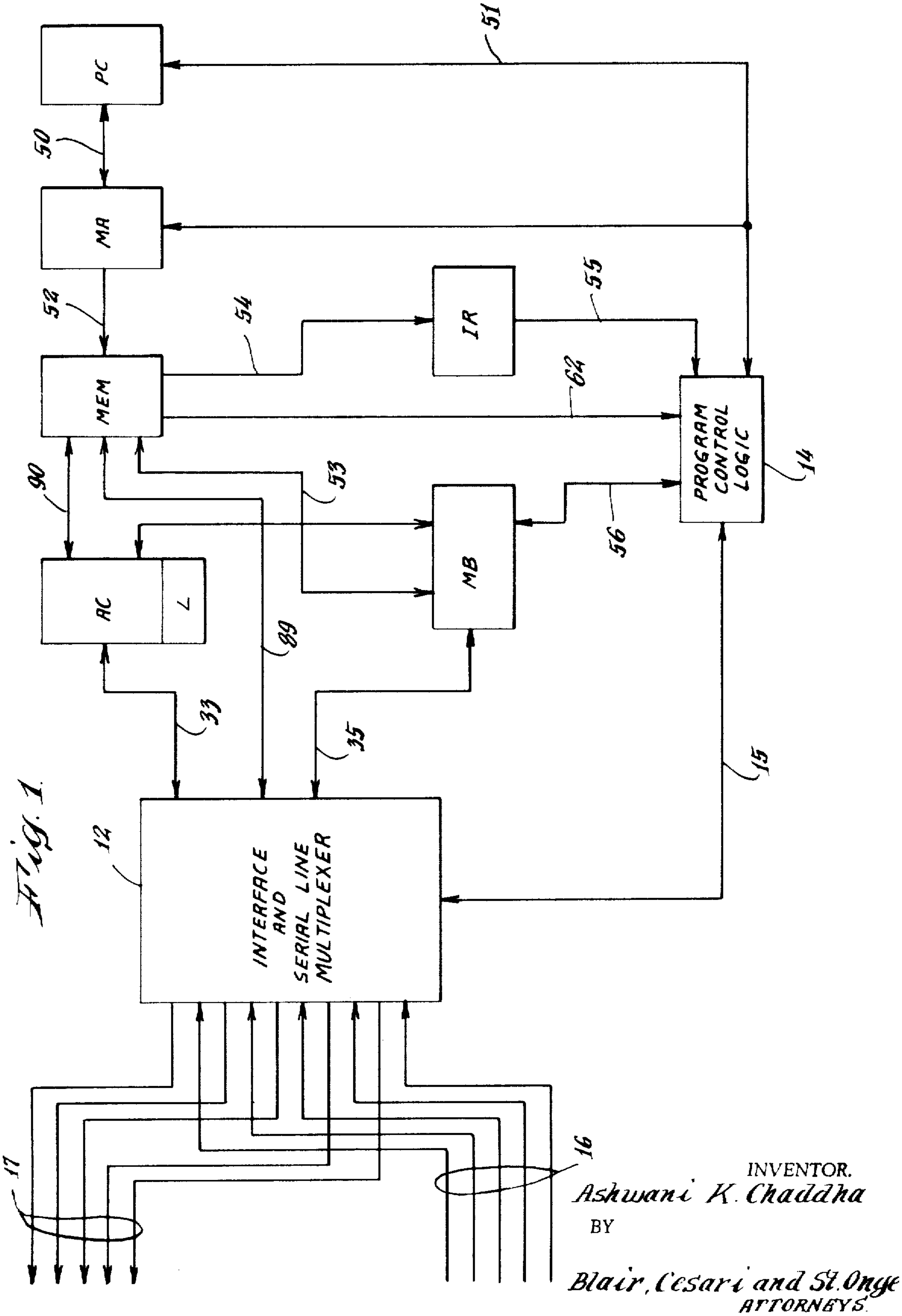
FIG. 1 is an overall block diagram of a preferred embodiment of the present invention.

Referring specifically to FIG. 1, the accumulator AC is a 12-bit register functioning, insofar as the present invention is concerned, as an input-output register handling data transfers to and from the various data stations, and to and from a central station. The link is a one-bit register typically operating as an integral part of the accumulator AC. The core memory MEM is the main short-term storage unit of the system, storing coded instructions and data. The memory buffer register MB, a 12-bit register which handles a majority of the word transfers to and from the core memory MEM.

The instruction register IR contains the instruction currently being performed by the processor. The program counter PC is a register which contains the address of the core memory location from which the next data word or instruction is to be retrieved. The address in the program counter PC is transferred to the memory address register MA, which functions to address the memory MEM. Program control logic, generally indicated at 14, in part controls the various operations of the above-mentioned components in accordance with the invention. Among those components of FIG. 1 necessary to the invention but typically not found in a general purpose computer or processor is the interface and serial line multiplexer circuit 12, seen in greater detail in FIGS. 3 and 4.

Figure 3:
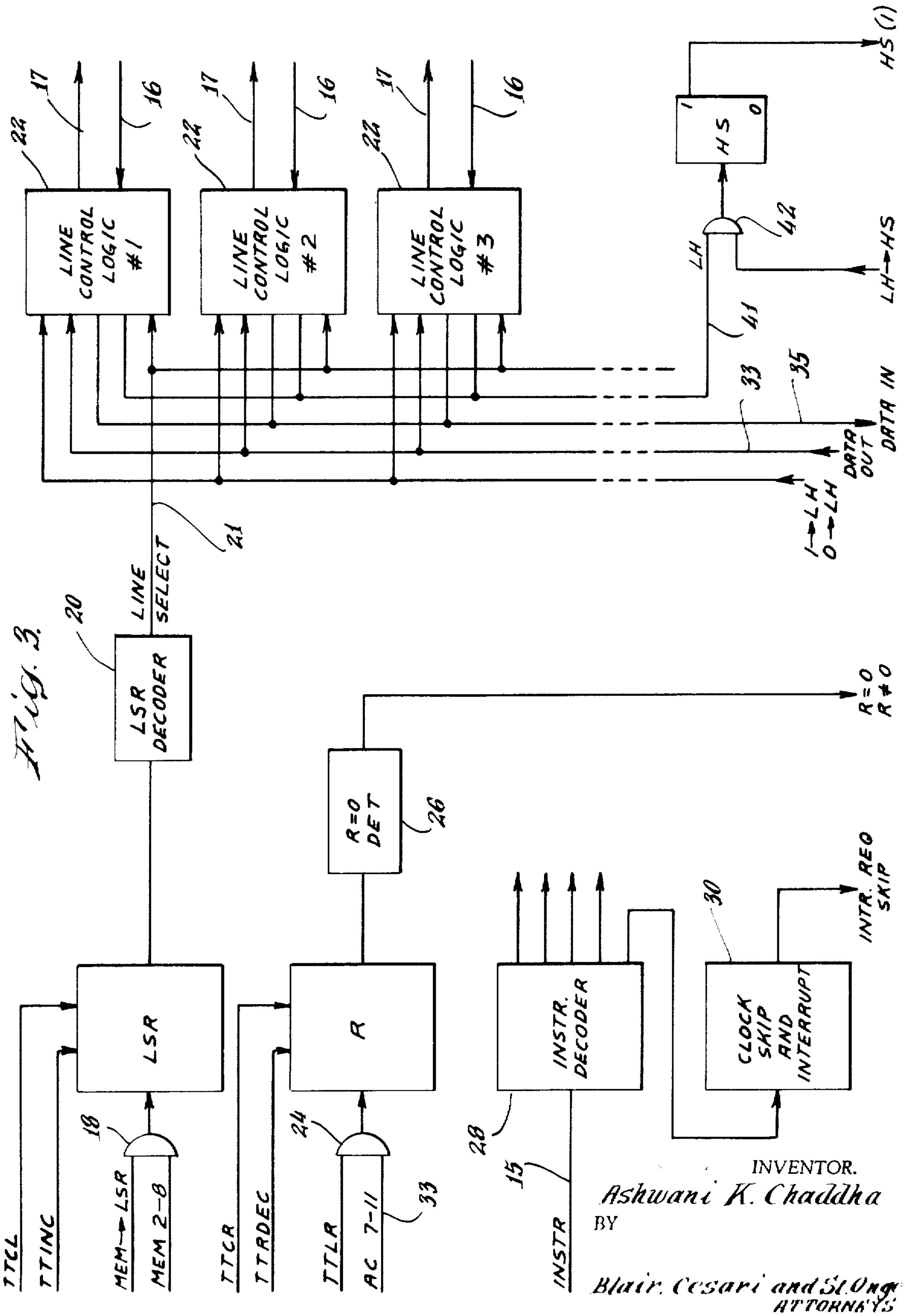
FIG. 3 is a block diagram of the serial line bit multiplexer shown in FIG. 1.

Referring to FIG. 3, the multiplexer circuitry 12 includes a line selection register LSR which is loaded with bits 2 through 8 of a line status word LSW stored in the memory MEM and uniquely associated with a particular one of the teleprinter input lines 16 connected to the multiplexer circuitry 12 from the individual data stations (not shown). Thus, each input line 16 is assigned a stored line status word LSW. Bits 2 through 8 of each line status word LSW designates the particular input line to which it is associated. As will be described more fully, line status words are read from the memory in succession, and the input line number portion thereof determines the sequence in which the input lines are sampled.

To load the line selection register LSR, bits 2 through 8 of each line status word are gated through an input gate 18 by an instruction MEM → LSR generated by the program control logic 14 of the processor during an appropriate input command or by the instruction decoder and logic circuit 28. The line number held in the line selection register LSR is decoded in a line selection register decoder 20, resulting in an output on connection 21 effective to condition one of the various line control logic circuits 22 to which the input lines 16 are separately connected. The selection of one of the line control logic circuits 22 serves to couple the input line 16 connected thereto to the multiplexer circuit 12 for the purpose of sampling for the presence of a character bit being transmitted thereover.

The line selection register LSR is cleared by an instruction TTCL and incremented by an instruction TTINC. The instruction TTINC is used for the purpose of selecting output lines 17 (FIGS. 1 and 3) in sequence for transmitting character bits to the various data stations.

Still referring to FIG. 3, a load distribution register R is loaded through an input gate 24 with bits 7 through 11 from the accumulator AC under the control of an instruction TTLR. As will be described in detail in connection with the flow diagram of FIG. 2, the register R functions to distribute the processing of assembled data characters received over the input lines 16 over a number of sampling cycles. This prevents undue variations in the sampling times of input lines assigned to the tail end of a sampling cycle. The register R is cleared by an instruction TTCR and decremented by an instruction TTRDEC. The content of the register R is constantly monitored by a detector 26 to sense when the register R has been decremented to zero.

Also shown in FIG. 3 is the instruction decoder and logic circuit 28 which is connected over connection 15 to the program control logic 14 (FIG. 1). Instructions are decoded to derive the instruction control signals for controlling the operation of the line selection register LSR, the load distribution register R, etc.

A clock skip and interrupt circuit 30 shown generally in FIG. 3 also receives instructions from the program control logic 14 via the instruction decoder 28. The clock skip and interrupt circuit generates interrupt requests which are fed to the program control logic 14 over connection 15 for the purpose of initiating each input line sampling cycle for a group of lines.

Figures 4, 5:
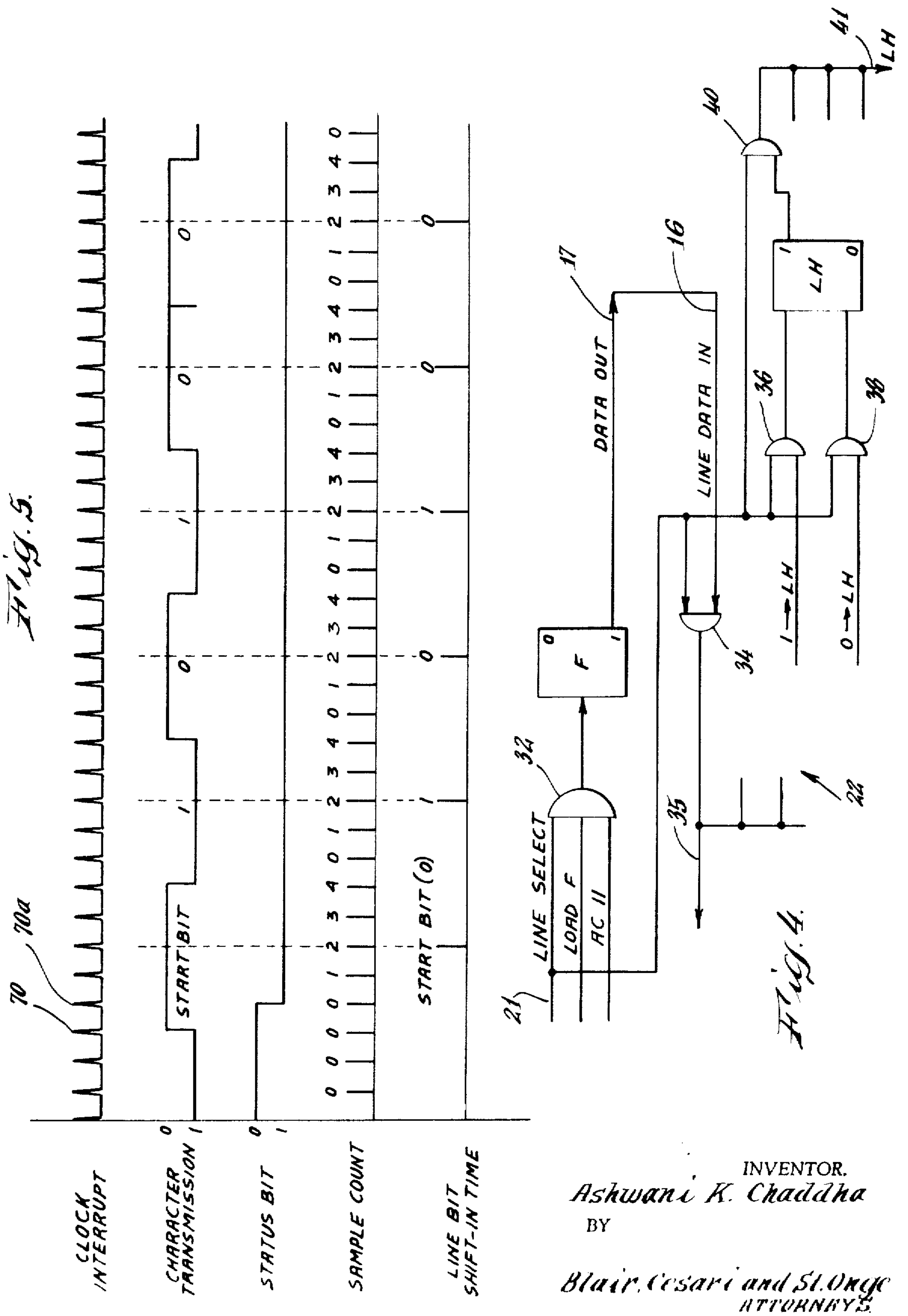
FIG. 4 is a block diagram of the line control logic circuits shown generally in FIG. 3.
FIG. 5 is a timing diagram relating the operation of the system of FIG. 1 to the arrival of bits making up a teleprinter character.

The individual line control logic circuits 22 of FIG. 3 are shown in greater detail in FIG. 4. The line control logic circuits are individually selected by signals from the line selection register LSR coupled over the line select connection 21 for accepting input data or transmitting output data. This line select output serves to condition an input gate 32 in only one of the line control logic circuits 22 when the system is in a data output program mode. Input gate 32 of the selected line control logic circuit is enabled by an instruction load F to load a flip-flop F over line 33 from the last stage, AC 11, of the accumulator AC. The character bit loaded into flip-flop F is then transmitted over the associated output line 17 to the appropriate data station.

The line select output originating from the line selector register LSR is also effective to condition an input gate 34 in one of the line control logic circuits 22 whose other input is an input line 16. When a particular one of the line control logic circuits 22 is selected, gate 34 is enabled to, in effect, connect the input line over an output lead 35 common to all of the other line control logic circuits to the input of the memory buffer register MB, and in some cases to the accumulator AC (FIG. 1).

Also included in each line control logic circuit 22 is a line hold flip-flop LH. This flip-flop is used as a memory element signifying the situation where a completed character has been received over the associated input line 16 but has not been processed during a previous sampling cycle due to a load distribution restraint imposed by load distribution register R. The flip-flop LH is set by an instruction 1 → LH which is passed through input gate 36 when conditioned by the line select signal. The flip-flop LH is set after a data character has been fully assembled and is reset through an input gate 38 by the signal 0 → LH after the assembled character has been processed by the system. The set output of the flip-flop LH is gated with the line select signal in an output gate 40, whose output is common to the corresponding gate outputs of all the other line control logic circuits 22. This common output on line 41 is applied to one input of a coincidence gate 42 seen in FIG. 3. This gate is enabled by an instruction LH → HS which serves to transfer the content of the flip-flop LH in a selected line control logic circuit 22 to a hold sync flip flop HS. The hold sync flip-flop HS functions with the register R to achieve load distribution in the processing of assembled data characters.

The clock skip and interrupt circuit 30 shown in FIG. 3 includes one or more clocks, each generating clock interrupt pulses for application over connection 15 to the program control logic 14 of FIG. 1. It is contemplated that as many as four different clocks may be included in the clock interrupt circuit 30. Each clock generates clock interrupt pulses at a rate which is a predetermined number of times the rate at which characters are being transmitted over input lines assigned thereto. In the preferred embodiment of the invention, the clocks generate clock interrupt pulses at a rate of five times the baud rate of the character bits transmitted over their assigned input lines 16. Thus, the system of the invention can accommodate input lines of a number of different baud rates.

In response to each clock interrupt pulse supplied to the program control logic, the computer or processor interrupts any operations in progress and determines which of the clocks has caused the interrupt. The processor then initiates a sampling cycle for these input lines 16 assigned to the system clock causing the interrupt. Upon the completion of this sampling cycle, the processor will entertain an interrupt generated by one of the other clocks in the clock interrupt circuit 30. After completion of a sampling for input character bits on all of the input lines 16 and in the intervals between the sampling subcycles for input lines of different baud rates, there is time during which the system is programmed to transfer teleprinter messages to and from a central station, and to transmit character bits over the output lines 17 to the various data stations. After the performance of these specified functions concerned with the invention, there is normally sufficient additional time before the occurrence of the next clock interrupt pulse to allow the processor to perform other functions wholly unrelated to the invention.

Before considering in detail the overall operation of the system in accepting character bits of data characters transmitted randomly over the input lines 16, it is pointed out that preferably a block of addresses in the memory MEM is set aside for the input lines 16 of the same baud rate. (Different blocks of input lines are assigned for different baud rates.) Each input line is assigned four consecutive memory address locations in the block. The first of these three locations contains an instruction word indicating that a teleprinter input command TTI is to be executed with respect to the associated input line.

The next memory address location in the sequence contains a line status word LSW. This word has three parts, namely, (1) a status bit indicating whether a data character was being received on the associated input line when last sampled, (2) the number of the associated line which is loaded into the line selection register LSR in order to select the associated input line for sampling, and (3) a sample counter, operating during the reception of a character to provide a count of the number of line samplings since the last-received bit in the character was assembled.

The next memory address location in sequence holds a character assembly word CAW into which the character bits are inserted as received over the associated input line. The last memory address location in sequence holds a JMS instruction which, when entered into, initiates a sub-routine for transferring a fully assembled character from the character assembly word address location in the memory to another memory location from which it is ultimately retrieved for transmission to the central station. This sub-routine, is entered to process an assembled character only if the load distribution restraint imposed by the register R (FIG. 3) is not present.

Generally, the next consecutive memory address locations are the instruction TTI, line status word LSW, character assembly word CAW and JMS instruction for the next input line 16 to be sampled, and so on. As will be seen, this conveniently enables the system to proceed through a full sampling cycle with successive increments of the program counter PC incident to addressing the memory MEM for the four-word locations of each input line in sequence.

It will be noted that the sequence in which the input lines are sampled is not however determined by the order in which the program counter PC addresses the memory MEM through the memory address register MA. Rather, the input line sampling sequence is determined by the line numbers of successive line status words retrieved from the memory during a sampling cycle. This conveniently allows the sampling sequence to be altered by merely changing the coded line numbers included in the line status words LSW stored in the memory MEM.

Figure 2:
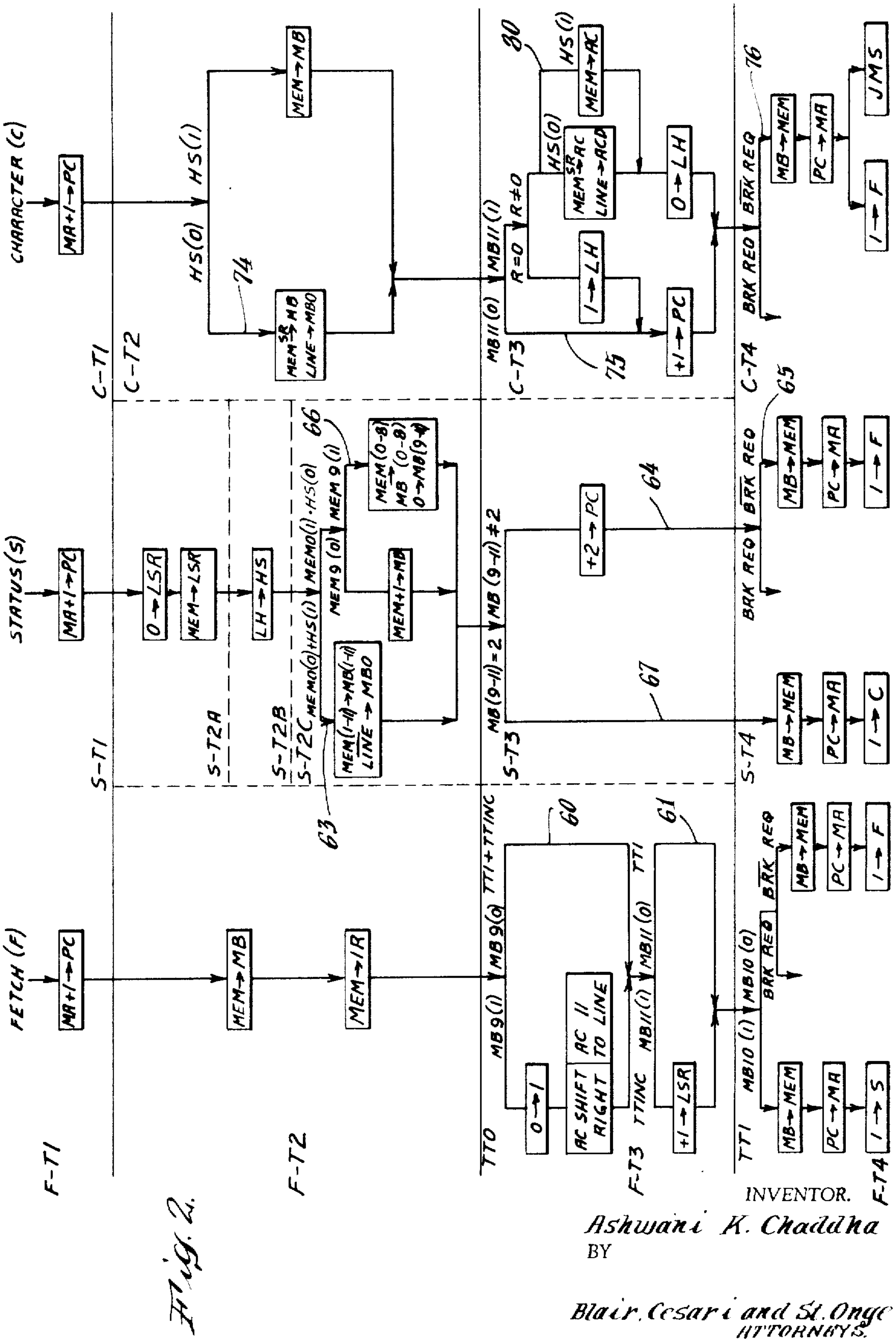
FIG. 2 is a flow diagram showing the various operations of the system of FIG. 1 in timed sequence.

The flow diagram of FIG. 2 sets forth the sequence of the various operations performed by the system incident to the sampling of each input line 16. These operations are repeated for each input line during a sampling cycle initiated by an associated clock interrupt pulse generated by the clock interrupt circuit 30 of FIG. 3. The various operations shown in FIG. 2 are grouped into three system cycles, F, S, and C. Each of these three cycles is divided into four time periods, T1, T2, T3 and T4 defined by a system timing control circuit found in conventional synchronously operated data processors of computers. Time period T2 of the cycle S is further divided into three subperiods, T2A, T2B and T2C. Although generally the operations taking place during a particular time period may be assumed to take place essentially simultaneously, delays built into the flip-flops used in the various registers actually allow the content of a first register to be transferred to another register while changing the content of the first. That is, the content of the first register prior to the changes is transferred to the second register.

Upon the occurrence of a clock interrupt pulse from the clock interrupt circuit 30 of FIG. 3, any system operations in progress are interrupted and the computer responds as in a conventional interrupt arrangement. It stores the contents of various registers and checks for the source of the interrupt signal. It then jumps to the appropriate memory address of the interrupting program by inserting an appropriate address into the memory address register MA. With this particular interrupt, the memory address to which the processor jumps is generally the first address in the memory block assigned to the input lines associated with the particular clock of the clock interrupt circuitry 30 causing the interrupt. The first few addresses in this block will ordinarily contain instructions and data relating to initiation of an input sampling cycle. One such instruction is to load the load distribution register R with a number determining how many assembled characters can be processed during this sampling cycle.

After proceeding through these preliminary addresses, the address of the instruction TTI for the first input line 16 to be sampled is entered into the memory address register MA. The processor then initiates an F cycle as seen in FIG. 2. During time period T1, the content of the memory address register is transferred to the program counter PC over connection 50 and incremented by 1 under the control of the program control logic 14 exerted over connection 51. The content of the memory address register MA, which still contains the address location of the instruction TTI, addresses the memory MEM over connection 52, causing this instruction TTI to be transferred from the memory to the memory buffer register MB over connection 53 during time period T2. The three most significant bits of this instruction are transferred from the memory MEM to the instruction register IR over connection 54. This portion of the instruction transferred to the instruction register merely determines that a teleprinter operation is to be carried out, and the program control logic 14 is conditioned accordingly over connection 55. The specific teleprinter operation, whether it be input TTI or input TTO and its associated instruction TTINC, is determined by decoding that portion of the instruction transferred to the memory buffer MB.

According to the convention adopted, an output instruction TTO is executed if the bit in the 10th stage of the memory buffer MB9 is a binary ONE. If the bit held in the eleventh stage of the memory buffer MB10 is a binary ONE, an input instruction TTI is executed. On the other hand, if the bit held in the 12th stage of the memory buffer MB11 is a binary ONE, the instruction TTINC is executed. The decoding of the contents of the last three stages of the memory buffer is performed by the program control logic 14 as supplied thereto over connection 56, or by the instruction decoder 28 included in the multiplexer 12 (FIG. 3).

Assuming a TTI instruction, the system proceeds through timer period T3 of the F cycle via the branch routines indicated at 60 and 61 during which no operations are performed. During time period T4, the bit held in the 11th stage of the memory buffer register MB is interpreted as a binary ONE, designating an input instruction TTI. The content of the memory buffer MB is returned to the memory MEM and the content of the program counter is transferred to the memory address register MA. This address in the memory address register MA, due to incrementation in the program counter PC during time period T1, is that of the line status word LSW of the input line to be sampled. The system then sets an S flip-flop (1 → S) which conditions the system to execute the S cycle.

Still referring to FIG. 2, the content of the memory address register MA is transferred to the program counter and incremented during time period S–T1. During time period S–T2A the line selection register LSR of FIG. 3 is cleared by a command TTCL issued by the instruction decoder 29 (FIG. 3). The input line number represented by bits 2 through 8 of the line status word LSW is transferred from the memory to the line selection register LSR. This line number is decoded to provide a line select output on line 21 for enabling gate 34 in the line control logic circuit 22 of FIG. 4 associated with the input line to be sampled.

During time period S–T2B, the content of the line hold flip-flop LH of the selected line control logic circuit 22 is transferred through the enabled gate 40 and line 41 to the hold sync flip-flop HS (FIGS. 3 and 4). The significance of this operation will be described later.

At this point, the first bit MEMO of the line status word LSW held in the memory is interpreted by the program control logic 14 over connection 62 or by the instruction decoder and logic 28, as desired. This is the status bit of the line status word LSW, which is a binary ZERO if no character bit was detected on the selected input line the last time it was sampled, i.e., the selected line was inactive. On the other hand, the status bit is a binary ONE if the selected input line was found to be active when last sampled. Assuming that the selected input line was inactive, the status bit is a binary ZERO (MEMO = 0) and the branch routine indicated at 63 is followed. The line status word is retrieved from the memory and loaded into the memory buffer register MB. The complement of the signal level then existing on the line, as connected through the enabled gate 34 in the selected line control logic circuit 22 (FIG. 4) to the memory buffer MB, is shifted into the first stage MBO thereof. When an input line 16 is inactive, it is clamped at an assertive level. Accordingly, for consistency within the system, the complement of the line bit ($\overline{\text{LINE BIT}}$) is shifted into stage MBO of the register MB. Thus, each time a selected input line is found to be inactive, a binary ZERO is shifted into memory buffer stage MBO to become the status bit for the next time the line is sampled.

If, on the other hand, transmission of a teleprinter character over the selected input line was initiated since last sampled, the first bit transmitted is a "start" bit. The complement of this start bit is shifted into the first stage MBO as the status bit indicating, when next sampled, that this input line is now active. In other words, a status bit is generated each time the sampled input line is found to be inactive, and the first time it is sampled after becoming active, the status bit is complemented.

Continuing to assume that the selected input line was inactive when last sampled, the S cycle enters time period S–T3. At this point, the last three stages of the memory buffer register MB, which contains the sample count, are decoded. As will be seen, the sample count of the line status word held in the memory buffer register MB is ZERO so long as the associated input line remains inactive. Until the sample count equals 2 (MB9–11 = 2) branch routine 64 is followed through time period T3 of the S cycle. During this time period, the program counter is incremented by 2 (+2 → PC) so as to bypass the memory address locations of the character assembly word and the JMS sub-routine for the selected input line. Thus, the program counter contains the memory address location of the input instruction TTI for the next input line to be sampled.

During time period S–T4, the system will entertain a break request to perform a function possibly unrelated to the present invention. The processor will determine whether the break request is of a nature that the requested function can be performed without unduly extending the duration of the sampling cycle in progress. Assuming no break request, the program follows branch routine 65, during which the line status word LSW in the memory buffer is returned to the memory, the address in the program counter PC is transferred to the memory address register MA, and a fetch flip-flop is set (1 → F) in order to condition another fetch (F) cycle. It will be noted that since the program counter PC is incremented by 2 during the time period S–T3, it contains the address of the input instruction TTI for the next input line. Thus, when this address is shifted into the memory address register MA during time period S–T4, the system is prepared to retrieve this next input instruction.

Still considering the S cycle shown in FIG. 2, if a start bit was detected on the selected input line when last sampled and its complement, a binary ONE, shifted into stage MBO to become the status bit indicating that the line is now active, then branch routine 66 is followed during the time period T2C. This is assuming that the hold sync flip-flop HS contains a binary ZERO. This signifies that the character assembly word CAW of the selected input line does not contain an assembled character which, because of a load distribution prohibition, has not been previously processed. It will be recalled that the sample count portion of the line status word LSW is constituted by the last three bits thereof held in memory bit locations MEM 9–11. The most significant bit of this sample count is held in memory bit location 9 (MEM9). This sample count, in accordance with the invention, is continuously cycled through a count of five (ZERO to four) while a data character is being transmitted over the associated input line. After the sample count has reached four, wherein the memory bit location 9 of the line status word contains a binary ONE, it is reset to ZERO.

Thus, during time period S–T2C as long as the status bit is a binary ONE and the hold sync flip-flop is a binary ZERO, the sample count is decoded to determine whether or not it is four. This is done by looking at memory bit location 9. If it is a binary ZERO (the sample count is not four), the line status word is transferred from the memory to the memory buffer over connection 53 (FIG. 1) and the sample count portion thereof is incremented by 1. If, however, memory bit location 9 is a binary ONE (MEM9–11 = 4), the line status word is transferred to the memory buffer MB and the last three stages are zeroed with the result that the sample count is reset to ZERO.

Upon entering time period S–T3 the sample count portion of the line status word LSW held in the memory buffer MB is decoded. If the sample count is not equal to 2, branch routines 64 and 65 are followed, and the system re-enters the fetch cycle F. On the other hand, if the sample count portion of the line status word is equal to two, branch routine 67 is followed. During time period S–T4, the line status word is returned to its assigned location in the memory and the address, incremented during time period S–T1 to express the address of the character assembly word CAW location in the memory, is transferred to the memory address register (PC → MA). The C cycle is then enabled (1 → C).

As will be seen, the C cycle is entered only when a character bit is to be assembled into the character assembly word CAW retrieved from the memory at that time. The most opportune time to enter the C cycle and accept for character assembly the bit being transmitted on the selected input line is determined by the sample count portion of the line status word. As seen in the timing diagram of FIG. 5, when the sample count has been incremented to 2 during an S cycle, which corresponds to the third time the selected input line has been sampled after the transmission of a start bit has been detected, the mid-point of the bit transmission is closely approximated. In the specific example shown in FIG. 5, the start bit comes up just after the occurrence of clock interrupt pulse 70. Thus, it is not detected during the ensuing sampling cycle. However, during the sampling cycle occasioned by the next clock interrupt pulse **70*a***, the presence of the start bit is detected by virtue of the fact that its complement, a binary ONE, is entered into the first memory buffer stage MBO to become the status bit indicating that this line is now active. It is noted that when the status bit first becomes a binary ONE, the sample count portion of line status word LSW is not incremented, thus remaining ZERO. During the sampling cycle instituted by the next clock interrupt pulse, the status bit is found to be a binary ONE during S–T2C and the sample count is incremented to 1. Then on the next sampling cycle, the status bit is still a binary ONE and the sample count is incremented to 2. At this point in the transmission time of the start bit, approximately 60 percent of the start bit pulse time interval has expired. It is seen that this is within 10 percent of the start bit pulse interval from its mid-point.

Still referring to FIG. 5, if the start bit came up just prior to the occurrence of clock interrupt pulse **70*a***, it is seen that the sample count reaches 2 approximately 40 percent into the start bit pulse duration. This is again within approximately 10 percent of the pulse interval from the mid-point thereof. It is thus seen that for the worst case conditions — when the start bit comes up either just before or just after an input line has been sampled as a result of a clock interrupt pulse, the sample count is incremented to 2 at a time which is within 10 percent of the pulse interval from the mid-point of the start bit pulse duration. It is seen that if the start bit comes up at substantially the mid-interval between clock interrupt pulses, the sample count reaches 2 at substantially the mid-point in the start bit pulse duration. Thus, the sampling error is ± 10 percent when the sampling rate is five times the baud rate as compared to a potential sampling error of 12.5 percent when the sampling rate is eight times the baud rate.

As was described, the sample count recycles through the count of 2, which actually corresponds to the third sampling of the line after a start bit has come up, with every five clock interrupt pulses. Since the bit pulse interval of a transmitted teleprinter character is uniform throughout, the sample count cycles through a two count close to the mid-point of each character bit pulse interval, or at the very worst within ± 10 percent. Thus by keying on the mid-point of the start bit pulse interval and assembling the character bits of the transmitted character at times corresponding to every fifth clock interrupt pulse, each line bit is assembled into the character assembly word CAW at the most opportune time during their respective pulse intervals.

Returning to FIG. 2, upon entry into the C cycle each time the sample count of the line status word equals two, the content of the memory address register, which is the memory address location of the character assembly word CAW for the selected input line, is transferred to the program counter PC and incremented by 1. Thus the address in the program counter PC is that of the JMS instruction identifying a sub-routine used to process an assembled character. During time C–T2, the content of the hold sync flip-flop HS, transferred thereto from the line hold flip-flop LH of the selected line, is decoded. It will be assumed that the hold sync flip-flop HS contains a binary ZERO, meaning that the character assembly word CAW of the selected input line does not contain an assembled character. As a result, branch routine 74 is followed. The character assembly word CAW is retrieved from the memory, entered into the memory buffer register MB and shifted right one place. The line bit being transmitted on the selected line is shifted into the first stage MBO thereof.

During time period C–T3, the character assembly word CAW in the memory buffer is decoded to determine if a character is now fully assembled. To facilitate this, the character assembly word CAW is preferably initialized with a binary ONE bit in an appropriate position depending upon the number of bits of the character. As the bits of the transmitted character are shifted into the character assembly word held in the memory buffer register, the initialized binary ONE bit is shifted to the right accordingly. When this initialized bit eventually reaches memory buffer stage MB11, the character has been completely received and assembled.

Thus, at time period C–T3, the 11th bit of the character assembly word held in stage MB11 of the memory buffer register MB is decoded. If it is a binary ZERO, the character is not completely assembled, and branch routine 75 is followed. The program counter PC is again incremented such that it now contains the address of the instruction TTI of the next input line to be sampled. During time period T4 of the C cycle, this system will entertain a break request and may act on it if the request can be carried out in the time available. Assuming no break request, branch routine 76 is followed. The character assembly word CAW in the memory buffer is returned to the memory and the content of the program counter is transferred to the memory address register MA. The fetch cycle is then enabled and the system goes on to service the next input line.

Still considering the C cycle shown in FIG. 2, it the subroutine, stage MB11 of the memory buffer register holding the character assembly word CAW at the beginning of time period C–T3 is detected as a binary ONE, the transmitted data character has been fully assembled either during this sampling cycle or a previous one. At this point, the assembled character in the character assembly word CAW must be processed and stored in a new memory location so that the character assembly word can be cleared and initiallized preparatory to receiving a next data character transmission. This processing of an assembled data character takes a certain amount of time and thus delays the entry into the fetch cycle F pursuant to sampling the next input line in sequence. This processing, carried out by jumping to a subroutine includes such operations as clearing and initiallizing the character assembly word CAW, removing the start and stop bits of the assembled character, tagging the assembled character to identify the line number over which it was transmitted, and transferring the assembled character to a new memory location for ultimate transmission to a central station along with other assembled data characters transmitted over the same input line. The load distribution register R is utilized so as to equitably distribute the subroutine processing time over the entire list of input lines sampled in a sampling cycle. Since the sampling rate in the preferred embodiment is five times the rate of character bit transmission, the system has at least five sampling cycles in which to process assembled characters for all of the input lines before it will have to assemble a start bit of another data character transmitted over any of the input lines.

Consequently, in accordance with the invention the load distribution register R is loaded with a number which is effectively one-fifth of the number of input lines being sampled in a sampling sequence prior to the initiation of the sampling cycle in response to a clock interrupt pulse. Thus, for 128 input lines of the same baud rate sampled during each sampling cycle, the load distribution register R is loaded with the number 26 prior to the initiation of each sampling cycle. Each time an assembled character is processed during an appropriate subroutine, the load distribution register R is decremented. After the load distribution register R has been decremented to 0 in a sampling cycle as the result of having processed a number of assembled data characters equal to the initial register content, no more assembled data characters can be processed during the remainder of the sampling cycle.

Thus, referring to FIG. 2, upon the detection of a binary ONE initiallized bit in memory buffer stage MB11, branch routine 80 rather than 75 is followed during time period C–T3. If the assembled character in the character assembly word held in the memory buffer register MB as well as its assigned location in the memory MEM cannot be processed because the load distribution register R has been decremented to 0, the line hold flip-flop LH of the selected line control logic circuit 22 is set (FIG. 4). The system then returns to branch routine 75 during time period C–T3 and the program counter is incremented (+1 → PC) pursuant to initiating a next fetch cycle F.

The fact that the line hold flip-flop LH of the selected line control logic circuit 22 was set to a binary ONE during time period C–T3 indicates that the associated input line has transmitted a data character which has been fully assembled in its assigned character assembly word CAW. When this input line is sampled during the next sampling cycle, the binary ONE in the line hold flip-flop LH is transferred during time S–T2B to the hold sync flip-flop HS (FIG. 3), common to all of the input lines.

The binary ONE state of the hold sync flip-flop HS indicates that the character assembly word CAW for the input line being sampled contains an assembled data character. This being the case, branch routine 63 is followed during time period S–T2C. It is noted that despite the fact that the character assembly word CAW of the sampled line contains an assembled character, the input line is nevertheless sampled for the presence of a start bit during the branch routine 63. Thus, the status bit of the line status word LSW reflects the condition of the sampled input line during the time that the system is waiting to process an assembled character previously transmitted thereover.

Returning now to the consideration of the C cycle shown in FIG. 2, if the character assembly word contains an assembled character (MB11 = ONE), and the load distribution register R does not contain a 0 (R ≠ 0), then it must be determined whether the character was assembled during this sampling cycle or a previous sampling cycle. This is shown by the content of the hold sync flip-flop HS. If the hold sync flip-flop contains a binary ZERO, the character was assembled during this sampling of the input line. If the flip-flop HS contains a binary ONE, the character was fully assembled into the character assembly word CAW during a previous sampling of this input line. Thus, if the character was fully assembled into the memory buffer register MB during time period C–T2 of this sampling cycle, the character assembly word CAW is retrieved from the memory, inserted into the accumulator over connection 90 (FIG. 1), shifted right one place and the line bit shifted into the first accumulator stage ACO over connection 33.

Assembly of the last bit of the transmitted data character into the character assembly word while it is held in the accumulator AC places it in the appropriate register for processing during the appropriate subroutine. The line hold flip-flop LH is reset to a binary ZERO to indicate during the next sampling of this input line that the previously assembled character has been processed and the character assembly word has been cleared for assembly of the next transmitted data character.

If the hold sync flip-flop HS is a binary ONE, meaning that the character assembly word CAW of this input line contains a character assembled during a previous sampling cycle, the character assembly word is transferred directly to the accumulator from the memory. Since the data character has already been assembled, the accumulator is not shifted for entry of the input line bit into the first stage thereof. Again, the line hold flip-flop LH is reset to a binary ZERO.

It is to be noted that the program counter PC is not incremented during branch routine 80 as it was for branch routine 75, thus the program counter contains the memory address location of the JMS instruction for processing the assembled character. This address is transferred to the memory address register and the transfer to the subroutine by a JMS instruction is performed prior to the initiation of a fetch cycle F pursuant to sampling the next input line in sequence.

When a complete message consisting of a plurality of data characters transmitted over a particular input line has been assembled by the system, the message may be transmitted at a rapid rate to a central station during an interval between sampling cycles under the control of a suitable program. Also during intervals between sampling cycles, the system can transmit data characters originating at the central station back to designated ones of the data station over output lines 17. This data is stored in the core memory MEM at predetermined locations specifically assigned to the individual stations to which the data is to be transmitted.

Still referring to FIG. 2, an output instruction TTO is initiated during those times when the system is not otherwise occupied with sampling the input lines over which input data is randomly transmitted. That is, priority should typically be given to servicing the input lines 16. Incident to the issuance of an output instruction TTO, the line number of the first output line 17 over which an output transmission is to be effective is entered into the line selection register LSR. The memory MEM is addressed by the memory address register for the output instruction of the first output line 17 in the output sequence. The content of the memory address register is also registered in the program counter PC and incremented by 1 during time period T1 of the F cycle. The output instruction TTO is then retrieved from the memory and inserted in the memory buffer register during time F–T2 and the three most significant bits of instruction are transferred from the memory to the instruction register IR. According to the convention used, an output instruction TTO is designated by a binary ONE in the 10th stage MB9 of the memory buffer MB. During time F–T3, the link is zeroed (0 → L) and the accumulator AC, which contains the data character to be transmitted, is shifted to the right one place. The data character bit contained in the last stage of the accumulator (AC11) is shifted out over connection 33 and through the enabled gate 32 of the line control logic circuit 22 selected from the line selection register LSR. This character bit is inserted into the flip-flop F for transmission over the selected output line 17 connected thereto (FIG. 4).

As seen in FIG. 2, once a data character bit has been shifted out of the accumulator and transferred to the selected line control logic circuit, the instruction in the memory buffer register is returned to the memory (MB → MEM), the content of the program counter is transferred to the memory address register (PC → MA) and another fetch cycle F is initiated.

The address now contained in the memory address register, due to the incrementation carried out during time period T1 of the F cycle, can be that of the line increment instruction TTINC. This instruction is retrieved from the memory and entered into the memory buffer register with the three most significant bits going to the instruction register IR during time period T2. During time period T3, the instruction TTINC, designated by a binary ONE in memory buffer stage MB11 causes the line selection register LSR to be incremented, thereby selecting the next output line in sequence through gate 32 (FIG. 4). Then during time period F–T4, the instruction in the memory buffer register MB is returned to the memory MEM, the content of the program counter is transferred to the memory address register, thus addressing the memory to the next output instruction TTO for the next output line over which a data character bit is to be transmitted. At the conclusion of time period F–T4, another fetch cycle is conditioned.

Rather than interlacing output instructions TTO and increment instructions TTINC the two may be microprogrammed by making the ninth and 11th bits of the instruction held in memory buffer register both binary ONES. Under these circumstances, an output instruction TTO is carried out during the initial portion of time period T3 and the line register is incremented during the latter portion thereof.

As in the case of the system described in U.S. Pat. No. 3,416,141, the instant system does not operate to transmit character bits on all of the output lines 17 during a single output cycle. Rather, the system is preferably programmed to select the output lines in groups equal in number to the factor by which the clock interrupt pulse rate exceeds the teleprinter baud rate. Thus, in the illustrated embodiment, one-fifth of the output lines are selected during each output sequence occurring during an interval between input sampling cycles.

Rather than outputting data character bits over the output lines 17 during intervals between sampling cycles, the system may be programmed to entertain a break request during time S–T4 to output a data character over the output line connected to the line control logic circuit 22 (FIG. 4) selected by the line number portion of the line selector word held in the line selection register LSR. In this manner, an input line is selected to sample for input data character bits, and then a data character bit is transmitted on the output line associated therewith.

From the foregoing detailed description, it is seen that an important feature of the present invention is the concept of sampling input lines at a rate which is an odd number times the transmission baud rate. Thus, for teleprinter bits whose leading edge substantially coincides with a clock interrupt pulse, assembly of the bits occur either before or after the mid-point of the bits. The mid-point of the bit pulse intervals is thus effectively straddled, yet the absolute value of the potential sampling error is less than the sampling error for more rapid sampling rates having an even number relationship to the input baud rate. The additional benefit of implementing this concept is that less processor time is required to service the same number of input lines, quite simply because fewer sampling cycles are carried out during the interval of a character bit transmission. For example, for a situation where the system of U.S. Pat. No. 3,416,141 would require 66 percent of the processor's time, the system of the present invention requires only 43 percent of the processor's time. This is a significant improvement in efficiency.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and desired to secure by Letters Patent is:

1. A system for assembling character bits of data characters randomly transmitted in serial bit format from plural data sources, said system comprising, for each data source, in combination:
   A. means sampling said data source for incoming character bits at a rate of $n$ times the rate at which the character bits are transmitted therefrom, where $n$ is an odd number greater than 1,
   B. counter means for cycling through a count of $n$,
   C. means operating in conjunction with said sampling means to increment said counter means each time said data source is sampled during the interval of a character transmission therefrom,
   D. decoding means connected to a counter means for responding to $(n+1)/2$ in said counter, and
   E. means responsive to said decoder means for accepting a character bit from said data source each time said counter means contains $(n+1)/2$.

2. The system defined in claim 1 wherein $n=5$.

3. A system for assemblying character bits of data characters randomly transmitted in serial bit format over plural input lines, said system comprising, in combination:
   A. a clock periodically generating clock pulses at a rate of $n$ times the rate at which bits of a character are transmitted over an input line,
      1. where $n$ is an odd number greater than 1;
   B. a scanner responsive to each said clock pulse for sampling each of the input lines for incoming character bits;
   C. a memory storing
      1. a character assembly word associated with each input line, and
      2. a count word associated with each input line for timing a character transmission thereover;
   D. a register;
   E. means operating in conjunction with such scanner to increment, during each sampling, the count word associated with input lines over which character transmissions are in progress,
      1. said count words being repeatedly reset to zero upon reaching a count of $n$ during the interval of a character transmission; and
   F. assembly means operating in synchronism with said scanner
      1. to load said register with the character assembly word associated with an input line being sampled whose count word has reached a count of $n/2 + ½$,
      2. load the character bit being transmitted over the input line into said register, and
      3. return the character assembly word to said memory.

4. The system defined in claim 3, wherein $n$ equals 5.

5. The system defined in claim 3, wherein said memory stores a line status word associated with each input line,
   1. said line status word including the coded line number of the associated input line,
      a. said line number being supplied to said scanner to control the selection of the associated input line for sampling.

6. The system defined in claim 5, wherein each said count word is included as a portion of a correspondingly associated one of said line status words.

7. The system defined in claim 6, wherein each said line status word further includes a status bit, and said system further includes:

A. means for coding said status bit to indicate that the associated input line has been found active during a sampling thereof.

8. The system defined in claim 3, which further includes:

A. means for detecting when all of the bits of a character have been transmitted over an input line and assembled into the character assembly word associated therewith; and B. means controlling the processing of an assembled character, said means including 1. a load distribution register loaded at the beginning of each sampling cycle with a number which is a predetermined fraction of the total number of input lines to be sampled in a sampling cycle, 2. means for decrementing said load distribution register each time an assembled character is processed during a sampling cycle, and inhibiting the processing of additional assembled characters during the sampling cycle in progress when said load distribution register content is zero, a. said additional assembled characters being processed during subsequent sampling cycles.

9. A system for assembling character bits of data characters randomly transmitted in serial bit format over plural input lines, said system comprising, in combination:

A. a clock periodically generating clock pulses, the interval between said clock pulses being substantially less than the signal duration of a transmitted character bit;

B. means operating in response to each said clock pulse to initiate a sampling cycle during which each input line is successively sampled for a character bit transmission;

C. a memory storing 1. a character assembly word associated with each input line, and 2. a line status word associated with each input line, said line status words including a. a count word portion for timing a character transmission;

D. a first register adapted to temporarily hold the line status word of each input line as it is sampled during a sampling cycle;

E. means incrementing the count word portion of a line status word each time it is held in said first register during a character transmission over the associated input line;

F. assembly means responsive to the count word portion of each line status word each time it cycles to a predetermined count to transfer the correspondingly associated character assembly word into said first register, enter the character bit being transmitted over the associated input line for assembly into said character assembly word; and return said character assembly word to said memory;

G. means detecting when all of the bits of a character have been transmitted over an input line and assembled into the associated character assembly word; and H. means controlling the processing of assembled characters, said means including 1. a second register loaded at the beginning of each sampling cycle with a number which is a predetermined fraction of the total number of input lines to be sampled in a sampling cycle, and 2. means for decrementing said second register each time an assembled character is processed during a sampling cycle, and inhibiting the processing of additional assembled characters during the sampling cycle in progress when said register content is zero, a. said additional assembled characters being processed during subsequent sampling cycles.

10. The system defined in claim 9, wherein said clock pulses are generated at a rate of $n$ times the rate at which character bits are transmitted over the input lines, where $n$ is an odd number greater than 1, said count word portion of said line status words is repeated incremented to a count of $n$ and reset during a character transmission over the associated input line, and said assembly means operates to assemble a character bit each time a count word portion reaches $n/2+½$.

11. The system defined in claim 10, wherein $n$ equals 5.

12. The system defined in claim 9, wherein each said line status word also includes a coded line number of the input line associated therewith, and said clock pulse responsive means includes 1. a line selection register accepting the line number portion of each line status word as they are successively held in said first register, 2. a decoder operating to selected a particular input line for sampling on the basis of the line number held in said line selection register.

13. The system defined in claim 9, which further includes:

A. a storage element associated with each input line, said element 1. conditioned to during subsequent sampling cycles those character assembly words which contain assembled characters awaiting processing.

14. The system defined in claim 9 wherein each input line has a specified rate at which it transmits data characters, the input lines with substantially the same transmission rates being categorized in a group, said system additionally comprising one of said clocks and one of said clock responsive means for each separate group of input lines.

15. In a system for assembling character bits of data characters randomly transmitted in serial bit format over a plurality of lines including means cyclically operable for sampling the plurality of input lines in succession and for assembling the character bits and means for detecting when all of the bits of a character have been transmitted over an input line and assembled into a character assembly word associated therewith, means for controlling the processing of an assembled character including:

A. a load distribution register loaded at the beginning of each sampling cycle with a number which is a predetermined fraction of the total number of input lines to be sampled in a sampling cycle, and B. means for decrementing said load distribution registers each time an assembled character is processed during a sampling cycle, said means inhibiting the processing of additional assembled characters during the sampling cycle in progress when the load distribution register count is zero.

16. The system as defined in claim 15 wherein additional assembled characters, not processed during one sampling cycle because said decrementing and inhibiting means prevents further assembly, are processed during subsequent sampling cycles.

17. The system defined in claim 15 including a storage element associated with each input line, said element being conditioned to designate, during subsequent sampling cycles, those character assembly words which contain assembled characters awaiting processing.

* * * * *